US011906124B2

(12) United States Patent
Tang et al.

(10) Patent No.: US 11,906,124 B2
(45) Date of Patent: Feb. 20, 2024

(54) MULTIBAND ADJUSTABLE LIGHTS

(71) Applicant: Apple Inc., Cupertino, CA (US)

(72) Inventors: Xiaofeng Tang, San Jose, CA (US); Christopher P Child, San Jose, CA (US); Clarisse Mazuir, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/721,147

(22) Filed: Apr. 14, 2022

(65) Prior Publication Data

US 2022/0390082 A1 Dec. 8, 2022

Related U.S. Application Data

(60) Provisional application No. 63/208,316, filed on Jun. 8, 2021.

(51) Int. Cl.

| | |
|---|---|
| ***F21S 41/683*** | (2018.01) |
| ***F21S 41/27*** | (2018.01) |
| ***F21S 41/43*** | (2018.01) |
| ***F21S 41/20*** | (2018.01) |
| ***F21S 41/32*** | (2018.01) |
| ***F21S 41/13*** | (2018.01) |
| ***F21S 41/63*** | (2018.01) |

(52) U.S. Cl.
CPC ............. *F21S 41/683* (2018.01); *F21S 41/13* (2018.01); *F21S 41/27* (2018.01); *F21S 41/285* (2018.01); *F21S 41/32* (2018.01); *F21S 41/43* (2018.01); *F21S 41/635* (2018.01)

(58) Field of Classification Search
CPC ........ F21S 41/683; F21S 41/635; F21S 41/13; F21S 41/43; F21S 41/285
See application file for complete search history.

(56) References Cited

U.S. PATENT DOCUMENTS

| | | | | |
|---|---|---|---|---|
| 6,896,396 | B2 | 5/2005 | Yagi | |
| 9,878,655 | B2 | 1/2018 | Tanaka et al. | |
| 9,885,813 | B2 * | 2/2018 | Yamanaka | G02B 5/26 |
| 10,086,747 | B2 | 10/2018 | Higgins-Luthman et al. | |

(Continued)

FOREIGN PATENT DOCUMENTS

| | | |
|---|---|---|
| CN | 103091759 A | 5/2013 |
| CN | 103492228 A | 1/2014 |

(Continued)

*Primary Examiner* — Matthew J. Peerce

(74) *Attorney, Agent, or Firm* — Treyz Law Group, P.C.; G. Victor Treyz; David K. Cole

(57) ABSTRACT

A system may have lights. The lights may emit visible and infrared light. Infrared light may be used to illuminate objects that are monitored using infrared image sensors or other infrared sensors. Visible light may be used to illuminate objects that are viewed by users and which may be monitored using sensors. The lights may be adjustable. An adjustable light may have a light source that contains an infrared light-emitting device such as an infrared light-emitting diode and a visible light-emitting device such as a visible light-emitting diode. A reflector may reflect light from the light source towards a lens. An adjustable light-blocking device may be located between the reflector and the lens. The light-blocking device may allow infrared light to pass unimpeded while adjusting visible light passing to the lens.

22 Claims, 5 Drawing Sheets

(56) References Cited

U.S. PATENT DOCUMENTS

| | | | | |
|---|---|---|---|---|
| 10,094,527 | B1 | 10/2018 | Bushre | |
| 10,807,515 | B2 | 10/2020 | Higgins-Luthman et al. | |
| 2004/0240219 | A1 | 12/2004 | Oishi et al. | |
| 2006/0002124 | A1 | 1/2006 | Nguyen | |
| 2006/0050513 | A1 * | 3/2006 | Brauneck | F21S 41/13 362/293 |
| 2008/0137357 | A1 | 6/2008 | Friedrichs et al. | |
| 2009/0052200 | A1 | 2/2009 | Tessnow et al. | |
| 2014/0264088 | A1 * | 9/2014 | Larsen | F21V 9/00 359/350 |
| 2020/0333182 | A1 | 10/2020 | Ahmed et al. | |
| 2021/0004990 | A1 * | 1/2021 | Kamio | H04N 23/00 |

FOREIGN PATENT DOCUMENTS

| | | | |
|---|---|---|---|
| CN | 104296074 | A | 1/2015 |
| CN | 109219763 | A | 1/2019 |
| CN | 110446628 | A | 11/2019 |
| CN | 110715261 | A | 1/2020 |
| CN | 111556980 | A | 8/2020 |
| EP | 1191279 | A2 | 3/2002 |
| EP | 2399776 | A2 | 12/2011 |
| FR | 2847334 | A1 | 5/2004 |
| WO | 2021052972 | A1 | 3/2021 |

* cited by examiner

MULTIBAND ADJUSTABLE LIGHTS

This application claims the benefit of provisional patent application No. 63/208,316, filed Jun. 8, 2021, which is hereby incorporated by reference herein in its entirety.

FIELD

This relates generally to systems such as vehicles, and, more particularly, vehicles that have lights.

BACKGROUND

Automobiles and other vehicles have lights such as headlights. To accommodate different driving conditions, headlights are sometimes provided with low beam and high beam settings.

SUMMARY

A vehicle may have lights such as headlights. The lights may be multiband lights that emit both visible and infrared light. During vehicle operation, infrared light from the lights may be used to illuminate objects that are monitored using infrared image sensors or other infrared sensors. For example, an autonomous driving system in the vehicle may use infrared sensor information in performing autonomous driving operations. Visible light from the lights is used to illuminate objects for viewing by vehicle occupants and to support the operation of visible light sensors.

Vehicle lights may be adjustable. For example, headlights may be placed in a high-beam mode in which visible light is emitted in a high-beam pattern and may be placed in a low-beam mode in which visible light is emitted in a low-beam pattern.

An adjustable light may have a light source that contains an infrared light-emitting device such as an infrared light-emitting diode and a visible light-emitting device such as a visible light-emitting diode. An optical combiner may be used to mix infrared light from the infrared light-emitting device with visible light from the visible light-emitting device. This mixed infrared and visible light may be reflected towards a lens in the adjustable light using a reflector.

To adjust the pattern of visible light emitted from the light, the light may have an adjustable light-blocking device. The adjustable light-blocking device may be located between the reflector and the lens. The light-blocking device may be used to adjust which visible light rays pass from the reflector to the lens and thereby adjust the pattern of emitted visible light. At the same time, the adjustable light-blocking device may allow infrared light to pass unimpeded regardless of which visible light emission pattern has been selected. In this way, satisfactory infrared illumination may be provided for supporting the operation of sensors such as infrared image sensors.

DETAILED DESCRIPTION

A system such as a vehicle or other system may have components that emit light such as headlights and other lights. Headlights may be used to provide visible light illumination of a roadway. This allows vehicle occupants to view the roadway at night and in other low ambient lighting conditions such as at dawn or dusk, when weather reduces ambient light, or when a vehicle is traveling through a dark tunnel. Visible illumination may also be used to assist autonomous driving systems. If desired, an autonomous driving system may use infrared image data and other data from infrared sensors. For example, infrared illumination may help light up a roadway at infrared wavelengths so that an infrared image sensor associated with an autonomous driving system can monitor the roadway. In an illustrative arrangement, a headlight may be operated in high-beam and low-beam modes in which visible light illumination is adjusted while simultaneously providing infrared light illumination. The infrared light illumination may be provided in a pattern that does not diminish in coverage as the headlight is switched between the high-beam and low-beam modes.

Figure 1:
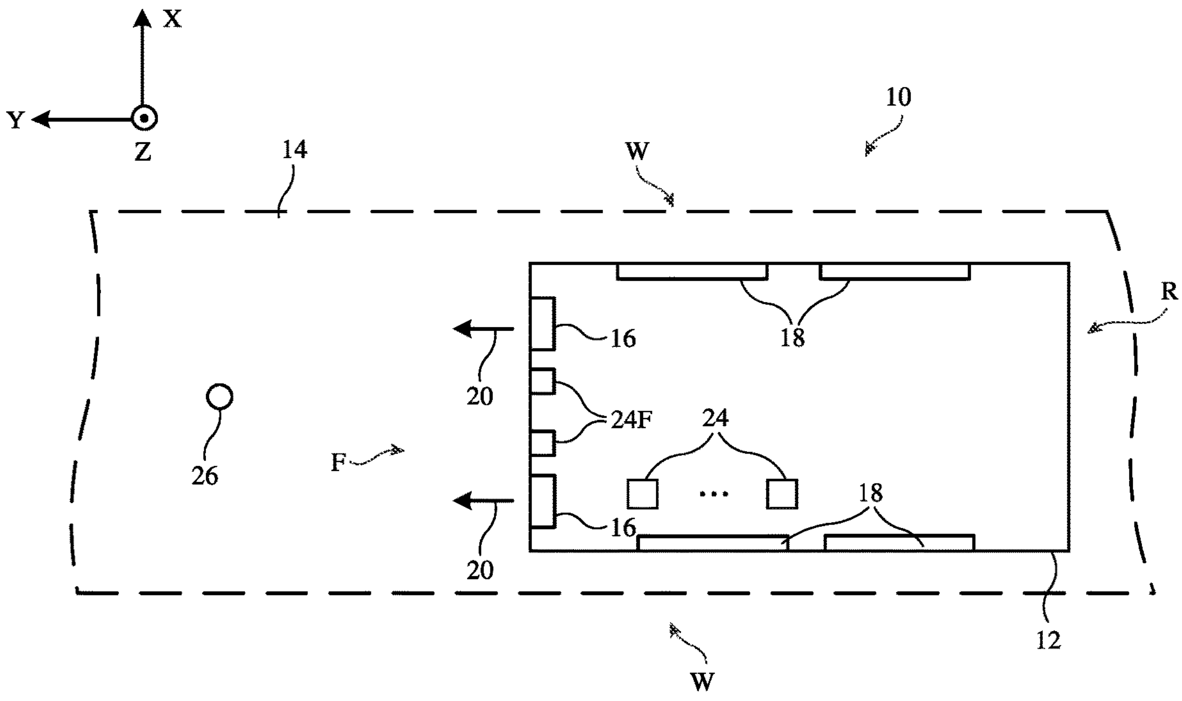
FIG. 1 is a top view of an illustrative vehicle in accordance with an embodiment.

FIG. 1 is a top view of a portion of an illustrative vehicle. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example. As shown in FIG. 1, vehicle 10 may be operated on roads such as roadway 14.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid undesired collisions with pedestrians, inanimate objects, and/or other external structures such as illustrative obstacle 26 on roadway 14.

Vehicle 10 may include a body such as body 12. Body 12 may include vehicle structures such as body panels formed from metal and/or other materials, may include doors, a hood, a trunk, fenders, a chassis to which wheels are mounted, a roof, etc. Windows may be formed in doors 18 (e.g., on the sides of vehicle body 12, on the roof of vehicle 10, and/or in other portions of vehicle 10). Windows, doors 18, and other portions of body 12 may separate the interior of vehicle 10 from the exterior environment that is surrounding vehicle 10. Doors 18 may be opened and closed to allow people to enter and exit vehicle 10. Seats and other structures may be formed in the interior of vehicle body 12.

Vehicle 10 may have automotive lighting such as one or more headlights (sometimes referred to as headlamps), driving lights, fog lights, daytime running lights, turn signals, brake lights, and/or other lights. As shown in FIG. 1, for example, vehicle 10 may have lights such as lights 16. In general, lights 16 may be mounted on front F of vehicle 10, on rear R of vehicle 10, on left and/or right sides W of vehicle 10, and/or other portions of body 12. In an illustrative configuration, which may sometimes be described herein as an example, lights 16 are headlights and are mounted to front F of body 12. There may be, as an example, left and right headlights 16 located respectively on the left and right of vehicle 10 to provide illumination 20 in the forward direction (e.g., in the +Y direction in which vehicle 10 moves when driven forward in the example of FIG. 1). By shining headlights 16 on roadway 14 in front of vehicle 10, vehicle 10 may illuminate roadway 14 and obstacles on roadway 14 such as obstacle 26.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, lighting, media playback, window movement, door operations, sensor operations, and/or other vehicle operations. For example, the control system may form part of an autonomous driving system that drives vehicle 10 on roadways such as roadway 14 autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, sensors, buttons, light-emitting diodes and other light-emitting devices, haptic devices, speakers, and/or other devices for gathering environmental measurements, information on vehicle operations, and/or user input and for providing output. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors. Output devices in components 24 may be used to provide vehicle occupants and others with haptic output, audio output, visual output (e.g., displayed content, light, etc.), and/or other suitable output.

During operation, the control circuitry of components 24 may gather information from sensors and/or other input-output devices such as lidar data, camera data (images), radar data, and/or other sensor data. Cameras, touch sensors, physical controls, and other input devices may be used to gather user input. Using wireless communications with vehicle 10, remote data sources may provide the control circuitry of components 24 with database information. Displays, speakers, and other output devices may be used to provide users with content such as interactive on-screen menu options and audio. A user may interact with this interactive content by supplying touch input to a touch sensor in a display and/or by providing user input with other input devices. If desired, the control circuitry of vehicle 10 may use sensor data, user input, information from remote databases, and/or other information in providing a driver with driver assistance information (e.g., information on nearby obstacles on a roadway and/or other environment surrounding vehicle 10) and/or in autonomously driving vehicle 10.

Components 24 may include sensors such as forward-facing sensors 24F (e.g., sensors that are directed in the +Y direction of FIG. 1 to detect structures in front of vehicle 10 such as obstacle 26 and roadway 14) and may include sensors facing in other directions. Sensors 24F and/or other sensors in vehicle 10 may include lidar, radar, visible and/or infrared cameras (e.g., two-dimensional image sensors and/or three-dimensional image sensors operating using structured light, binocular vision, time-of-flight, and/or other three-dimensional imaging arrangements), and/or may have other sensors.

To ensure that roadway 14 and obstacles such as obstacle 26 are sufficiently well illuminated to be visible to a user in vehicle 10 and to be visible to visible-light image sensors in sensors 26F, headlights 16 may produce visible light illumination. To help ensure that infrared image sensors in forward-facing sensors 24F receive sufficient reflected infrared light from the illuminated structures in front of vehicle 10, headlights 16 may also produce infrared illumination.

Visible light from headlights 16 can distract drivers and others in oncoming traffic, so it may be desirable to provide headlights 16 with the ability to operate in a visible-light high-beam mode in which visible light illumination from headlights 16 is provided over a relatively large area (e.g., a high-beam pattern that encompasses both objects that are far in front of vehicle 10 and objects that are closer to vehicle 10) and in a visible-light low-beam mode in which visible light illumination is provided over a reduced area (e.g., a low-beam pattern that is directed downward towards roadway 14 directly in front of vehicle 10). When a driver or vehicle system in vehicle 10 detects oncoming traffic, the headlights may be placed in the low-beam mode to avoid directing excessive light towards the oncoming traffic. When no oncoming traffic is present, the headlights may be adjusted to operate in the high-beam mode to increase the area over which illumination is provided.

Infrared illumination is not visible to oncoming traffic, so infrared light may be provided by headlights 16 over a wide (e.g., high-beam) pattern regardless of the visible light operating mode of headlights 16. In this way, infrared image sensors in forward-facing sensors 26F may be provided with satisfactory illumination even when headlights 16 have been adjusted to produce visible light in a low-beam pattern. Regardless of whether headlights 16 are configured to produce visible high-beam light or visible low-beam light, the infrared light can have a high-beam pattern to that illuminates roadway 14 and external objects such as obstruction 26. High-beam infrared light may be directed towards oncoming traffic, but will not disturb the occupants of oncoming vehicles, because this light is invisible to vehicle occupants.

Figure 2:
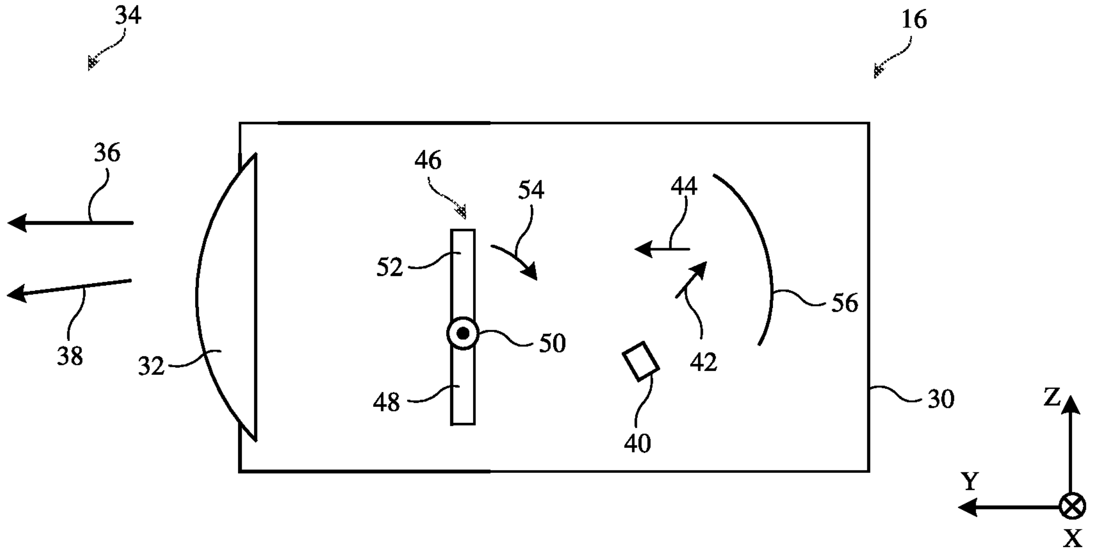
FIG. 2 is a side view of an illustrative adjustable headlight in accordance with an embodiment.

FIG. 2 is a cross-sectional side view of an illustrative adjustable headlight for vehicle 10. Vehicle 10 may have any suitable number of headlights (e.g., at least one, at least two, at least three, etc.). In an illustrative arrangement, vehicle 10 has left and right headlights 16 on front F of vehicle 10, as described in connection with FIG. 1. As shown in FIG. 2, headlight 16 may include headlight housing 30 and headlight lens 32. Housing 30 may include support structures and enclosure structures for supporting the components of headlight 16. These structures may facilitate mounting of headlight 16 to body 12. Housing 30 may include polymer, metal, carbon-fiber composites and other fiber composites, glass, ceramic, other materials, and/or combinations of these materials. Lens 32 may include polymer, glass, transparent ceramic, and/or other materials that are transparent to visible light and infrared light (e.g., near infrared light). Lens 32 may be formed from one or more lens elements and may be used to help collimate light 34 and direct light 34 from headlight 16 in desired directions (e.g., to produce illumination such as illumination 20 of FIG. 1).

Light 34 may include visible light (e.g., light from 400 nm to 750 nm) and infrared light (e.g., near infrared light at one or more wavelengths from 800 to 2500 nm or other suitable infrared light). Headlight 16 may be operated in a high beam mode and a low beam mode (as examples). In the high beam mode, emitted light 34 includes light 36 that is directed forward horizontally (along the +Y axis of FIG. 2) as well as light 38 that is angled down slighting from the +Y axis). In the low beam mode, some of the forward-directed light (e.g., light 36) is suppressed, so that only downwardly angled light such as light 38 is emitted.

Headlight 16 includes a light source such as light source 40. Light source 40 emits visible and infrared light 42. Light 42 may be reflected in forwards direction +Y by reflector 56 to produce reflected light 44. Reflector 56, which may be formed from metal, polymer, glass, and/or other materials, may have a parabolic profile or other curved cross-sectional profile (as an example). Metal coatings, dielectric thin-film coatings, and/or other coatings may be provided on reflector 56 to enhance reflectivity at visible and infrared wavelengths.

Reflected light 44 from reflector 56 may be controlled using an adjustable component such as adjustable light blocker 46. Light blocker 46 may be formed from an electrically adjustable light modulator layer, a physically adjusted shutter (e.g., a shutter that slides, rotates, and/or is otherwise moved by a positioner in a physical light-blocking device), or other device that can be electrically adjusted by control signals from control circuitry in components 24.

Adjustable light blocker 46 of FIG. 2 has a fixed shutter portion such as static shutter member 48 and a movable shutter portion such as movable shutter member 52. Member 52 may be moved relative to member 48 (e.g., in direction 54) using positioner 50. Positioner 50 may be electrically adjustable positioner such as a motor, solenoid, and/or other actuator that moves member 52 in response to commands from control circuitry in components 24. For example, positioner 50 may have a hinge and an actuator that rotates member 52 about a hinge axis associated with the hinge.

The control circuitry in components 24 can adjust light blocker 46 to adjust the visible component of light 44 that passes through lens 32. In a first mode (e.g., a low-beam mode), shutter member 52 is positioned as shown in FIG. 2 (e.g., so that member 52 lies in the X-Z plane). In this first mode, rays of light 44 at visible wavelengths are partially blocked by shutter member 52. As a result, at visible wavelengths, low-beam light 38 is present and high-beam light 36 is blocked and is not present. This visible light low-beam pattern may be used when vehicle 10 is facing oncoming traffic. In a second mode (e.g., a high-beam mode), shutter member 52 is rotated in direction 54 about an axis of rotation associated with positioner 50. When shutter member 52 is moved downwards in this way, more of the rays of reflected light 44 are allowed to pass blocker 46. As a result, at visible wavelengths, a high-beam pattern of emitted light is present (e.g., high-beam light that includes both light 36 and light 38 is emitted). This visible high-beam pattern may be used when vehicle 10 is not facing oncoming traffic.

To assist infrared light sensors in vehicle 10, infrared light from light source 40 may be emitted by headlight 16 in both the first and second modes. Member 52 may be configured to pass infrared light (e.g., near infrared light) and to block visible light. Accordingly, the position of member 52 may be adjusted to adjust the visible light emission from headlight 16 without affecting the infrared light emission from headlight 16. Because member 52 is transparent at infrared wavelengths, emitted light 34 may include both horizontal light 36 and downwardly angled light 38 at infrared wavelengths regardless of the position of member 52 (e.g., infrared light may be emitted in a high-beam pattern in both the first and second modes of operation). This allows vehicle 10 to provide sufficient infrared illumination in front of vehicle 10 for infrared sensors in vehicle 10 to operate satisfactorily.

Figure 3:
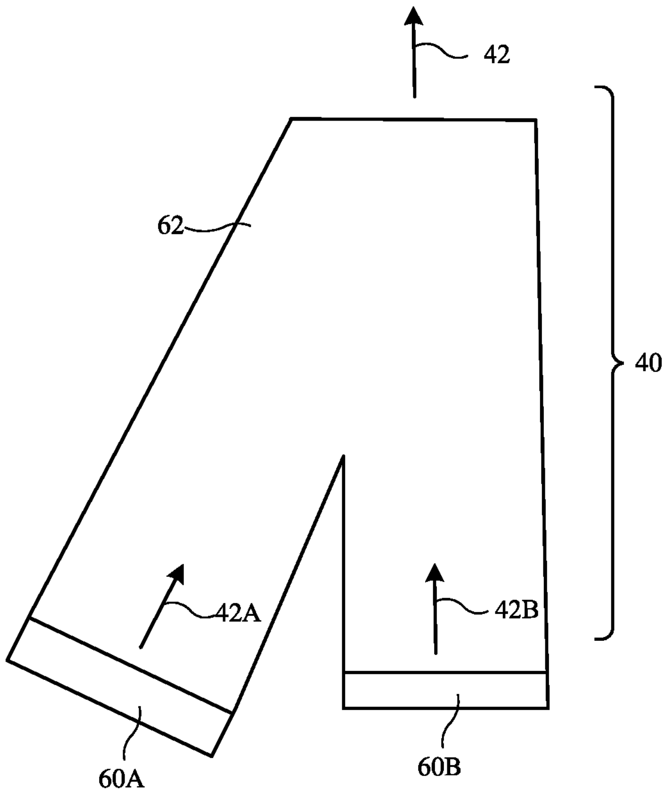
FIG. 3 is a top view of an illustrative light source for an adjustable headlight in accordance with an embodiment.

An illustrative light source for headlight 16 is shown in FIG. 3. As shown in FIG. 3, light source 40 may include a source of infrared light such as infrared light source 60A and a source of visible light such as visible light source 60B. Light sources 60A and/or 60B may be formed from lamps, light-emitting diodes, lasers, or other light-emitting devices. As an example, light source 60A may include one or more near-infrared light-emitting diodes and light source 60B may include one or more visible (e.g., white light) light-emitting diodes. Optical combiner 62 may be formed from glass, transparent polymer, transparent ceramic, or other material transparent to visible and near-infrared wavelengths. Combiner 62 may have a first arm with a first face that receives infrared light from infrared light 42A source 60A and may have a second arm with a second face that receives visible light 42A from visible light source 42B. The two arms of combiner 62 may be joined together so that light 42A and light 42B mix and are emitted together from a third face as mixed emitted light 42.

The surfaces of combiner 62 may be provided with cladding material (e.g., transparent polymer or other dielectric material with a lower refractive index than the refractive index of the core structures of combiner 62), may be provided with a reflective coating such as a metal coating or dielectric mirror coating, and/or may be provided with other structures that help confine light from light sources 60A and 60B within combiner 62. During operation, light from sources 60A and 60B propagates along the lengths of the arms of combiner 62 (e.g., this light may be guided internally in accordance with the principal of total internal reflection and/or due to reflections from metal surface coatings or other optical confinement structures). The arms of combiner 62 may be cylindrical or may have other suitable shapes (e.g., elongated shapes with circular cross sections, rectangular cross sections, etc.). The entrance faces of combiner 62 from which the arms of combiner 62 receive light from sources 60A and 60 may be circular, may be rectangular, or may have other suitable shapes. The exit face of combiner 62 from which the mixed infrared and visible light of source 40 is emitted may be circular, rectangular, and/or may have other suitable shapes.

Figure 4:
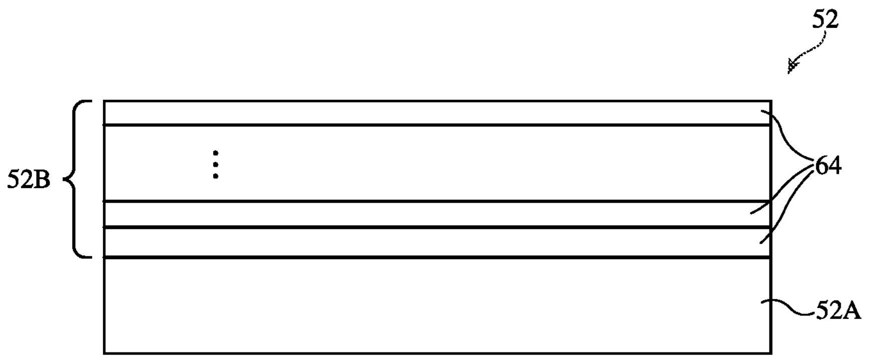
FIG. 4 is a cross-sectional side view of an illustrative visible-light-blocking-and-infrared-light-transmitting filter for a shutter member in an adjustable light-blocking device in accordance with an embodiment.

FIG. 4 is a cross-sectional side view of an illustrative movable member for adjustable light blocker 46. As shown in FIG. 4, member 52 may have a substrate such as substrate 52A and a spectral filter such as light filter 52B. Filter 52B may be formed from a visible-light-blocking-and-infrared-light-transmitting coating on substrate 52A. In an illustrative configuration, filter 52B may include a stack of thin-film layers 64 that form a thin-film interference filter. Layers 64 may be, for example, dielectric thin-film layers (e.g., layers of polymer and/or inorganic dielectric such as metal oxides, silicon oxide, silicon nitride, and/or other inorganic dielectric materials). The refractive indices of layers 64 may alternate between high and low values. The values of the refractive indices of layers 64 and the thicknesses of layers 64 may be configured to form a thin-film interference filter structure that provides filter 52B with desired wavelength-dependent light transmission spectrum such as the visible-light-blocking-and-infrared-light transmitting spectrum of FIG. 5.

Figure 5:
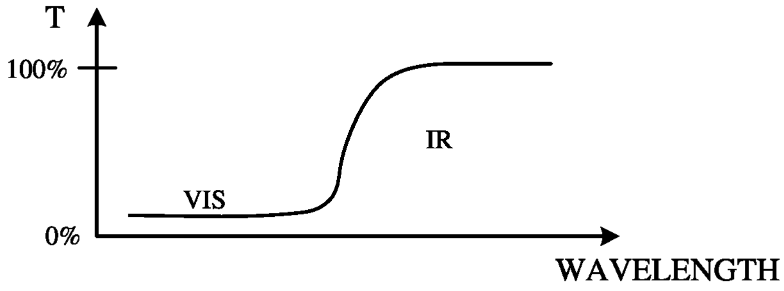
FIG. 5 is a graph in which light transmission has been plotted as a function of wavelength for an illustrative filter of the type shown in FIG. 4 in accordance with an embodiment.

In FIG. 5, light transmission T for filter 52B has been plotted as a function of wavelength. As shown in FIG. 5, filter 52B may block visible light VIS (e.g., T may be less than 20%, less than 5%, less than 1%, or other low transmission value for visible light wavelengths) and may pass near-infrared light IR (e.g., T may be at least 80%, at least 95%, at least 99%, or other suitable high transmission value for infrared light wavelengths such as near-infrared wavelengths).

Figure 6:
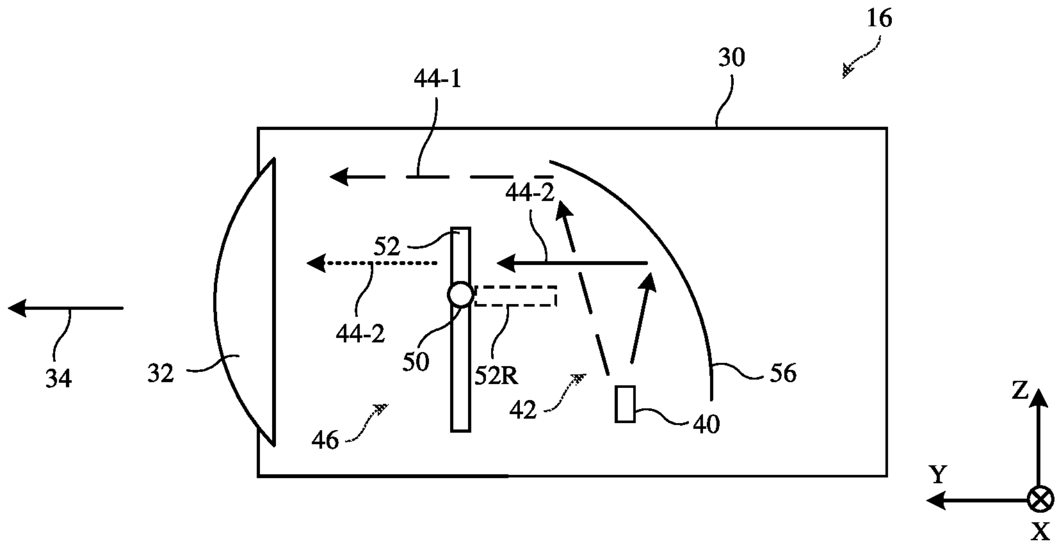
FIG. 6 is a cross-sectional side view of an illustrative adjustable headlight in accordance with an embodiment.

FIG. 6 is a cross-sectional side view of headlight 16 emitting light 34. FIG. 6 shows how some of light 42 from light source 40 (e.g., the light of rays 44-1) passes by adjustable light blocker 46 at both visible and infrared wavelengths after reflecting from reflector 56. Light rays 44-1 are not blocked by member 52 and therefore form low-beam light that is always emitted from headlight 16 when headlight 16 is active, regardless of the position of movable shutter member 52. Some of light 42 (e.g., the light of rays 44-2) is reflected from reflector 56 towards member 52 of adjustable light blocker 46. At infrared wavelengths, this light will either pass through member 52 (when member 52 is in the visible-light-blocking position shown in FIG. 6) or will pass by member 52 (when member 52 has been rotated out of the way by positioner 50 to rotated position 52R). At visible light wavelengths, light rays 44-2 will either pass member 52 (when member 52 has been rotated out of the way by positioner 50 to rotated position 52R) or will be blocked by member 52 (when member 52 is in the vertically extending visible-light-blocking position shown in FIG. 6).

Accordingly, infrared light will always be emitted widely (e.g., in a high-beam pattern) by headlight 16, whereas visible light will be emitted in either a low-beam pattern or a high-beam pattern depending on the state of light blocker 46. The low-beam visible light pattern emitted by headlight 16 in the low-beam mode of headlight 16 may be used to accommodate oncoming traffic. The high-beam visible light pattern emitted by headlight 16 in the high-beam mode may be used to enhance visible light illumination for occupants of vehicle 10 when oncoming traffic is absent (and may provide enhanced visible light illumination for visible light sensors in vehicle 10). The high-beam infrared light that is emitted in both of these operating modes may be used to help illuminate external objects for infrared cameras or other infrared sensors in vehicle 10. For example, high-beam infrared light may be used to illuminate objects so that infrared cameras and/or other infrared sensors in vehicle 10 can gather infrared images and/or other infrared sensor readings on the external environment surrounding vehicle 10. Vehicle 10 may use this infrared data in operating vehicle 10 (e.g., in operating an autonomous driving system for vehicle 10 and/or for providing driver assistance features for vehicle 10 such as proximity warnings.

Although sometimes described herein in the context of fixed headlight configurations, headlights 16 may be provided with positioners to steer housing 30 and thereby steer illumination 20, may be provided with adjustable sets of light-emitting diodes or other light-emitting devices that are configured to produce different patterns of illumination when different subsets of the devices are selectively activated, and/or may be provided with other structures that allow illumination 20 to be steered (e.g., left and right, up and down, etc.), and/or to be otherwise adjusted to form desired light patterns that are aimed in desired directions (e.g., headlights 16 may be adaptive headlights).

The foregoing is merely illustrative and various modifications can be made to the described embodiments. The foregoing embodiments may be implemented individually or in any combination.

What is claimed is:

1. A vehicle light, comprising:

a light source having an infrared light-emitting device and a visible light-emitting device and configured to emit light at visible and infrared wavelengths, wherein the light source comprises an optical combiner having a first arm with a first face configured to receive infrared light and having a second arm with a second face configured to receive visible light; and an adjustable light blocker having a movable member with a visible-light-blocking-and-infrared-light-passing thin-film interference filter.

2. The vehicle light defined in claim 1 wherein the adjustable light blocker has a positioner configured to move the movable member between:

a low-beam position in which first infrared light rays in the emitted light pass by the visible-light-blocking-and-infrared-light-passing thin-film interference filter and second infrared light rays in the emitted light pass through the visible-light-blocking-and-infrared-light-passing thin-film interference filter and in which first visible light rays in the emitted light pass by the visible-light-blocking-and-infrared-light-passing thin-film interference filter and second visible light rays in the emitted light are blocked by the visible-light-blocking-and-infrared-light-passing thin-film interference filter; and a high-beam position in which the first infrared light rays in the emitted light pass by the visible-light-blocking-and-infrared-light-passing thin-film interference filter and the second infrared light rays in the emitted light pass by the visible-light-blocking-and-infrared-light-passing thin-film interference filter and in which the first visible light rays in the emitted light pass by the visible-light-blocking-and-infrared-light-passing thin-film interference filter and the second visible light rays in the emitted light pass by the visible-light-blocking-and-infrared-light-passing thin-film interference filter.

3. The vehicle light defined in claim 2 wherein the infrared light-emitting device comprises an infrared light-emitting diode configured to produce the first and second infrared light rays and wherein the visible light-emitting device comprises a visible light-emitting diode configured to produce the first and second visible light rays.

4. The vehicle light defined in claim 3 where the first face of the optical combiner is configured to receive the first and second infrared light rays and the second face of the optical combiner is configured to receive the first and second visible light rays.

5. The vehicle light defined in claim 4 wherein the optical combiner has a third face from which the first and second infrared light rays and the first and second visible light rays are emitted.

6. The vehicle light defined in claim 1 wherein the optical combiner has transparent material configured to receive infrared light from the infrared light-emitting device and configured to receive visible light from the visible light-emitting device.

7. The vehicle light defined in claim 1 wherein the adjustable light blocker comprises an adjustable shutter and wherein the movable member comprises a movable shutter member having a substrate with a thin-film interference filter coating that blocks visible light and passes near-infrared light.

8. The vehicle light defined in claim 1 further comprising:
a lens; and
a reflector configured to reflect the emitted light towards the lens.

9. A vehicle, comprising:
a vehicle body;
an adjustable headlight on the vehicle body that comprises
a light source configured to emit infrared light and visible light,
an adjustable component,
a reflector,
an optical combiner configured to mix the infrared and visible light and to emit mixed light toward the reflector, and
a lens, wherein the optical combiner and the light source are interposed between the lens and the reflector; and
control circuitry configured to:
adjust the adjustable component to operate the adjustable headlight in:
a first mode in which the adjustable headlight emits the infrared light with a first pattern and in which the adjustable headlight emits the visible light with a second pattern; and
a second mode in which the adjustable headlight emits the infrared light with the first pattern and in which the adjustable headlight emits the visible light with a third pattern that is different than the second pattern.

10. The vehicle defined in claim 9 wherein the adjustable component comprises an adjustable light blocker.

11. The vehicle defined in claim 10 wherein the adjustable light blocker has a movable light filter.

12. The vehicle defined in claim 11 wherein the adjustable light blocker has an electrically adjustable positioner configured to move the movable light filter between a first position in the first mode and a second position in the second mode.

13. The vehicle defined in claim 12 wherein the movable light filter comprises a thin-film interference filter configured to block visible wavelengths and pass infrared wavelengths.

14. The vehicle defined in claim 9 wherein the second pattern comprises a low-beam visible light pattern and wherein the third pattern comprises a high-beam visible light pattern.

15. The vehicle defined in claim 14 wherein the first pattern comprises a high-beam infrared light pattern.

16. The vehicle defined in claim 15 further comprising an infrared image sensor configured to capture an infrared image of an object illuminated by the emitted infrared light of the high-beam infrared light pattern.

17. The vehicle defined in claim 9 further comprising an infrared sensor configured to capture an infrared image of an object illuminated by the emitted infrared light.

18. A vehicle headlight, comprising:
an infrared light-emitting diode configured to produce infrared light;
a visible light-emitting diode configured to produce visible light;
a reflector;
an optical combiner configured to mix the infrared and visible light and configured to emit the mixed infrared and visible light from an end face towards the reflector;
a lens; and
an adjustable light blocker between the reflector and the lens, wherein the adjustable light blocker comprises a spectral filter.

19. The vehicle headlight defined in claim 18 wherein spectral filter comprises a visible-light-blocking-and-infrared-light-passing filter and wherein the adjustable light blocker comprises a positioner configured to move the visible-light-blocking-and-infrared-light-passing filter.

20. The vehicle headlight defined in claim 19 wherein the positioner is configured to:
in a first mode, place the visible-light-blocking-and-infrared-light-passing filter in a first position in which a high-beam pattern of visible light is emitted from the lens; and
in a second mode, place the visible-light-blocking-and-infrared-light-passing filter in a second position in which a low-beam pattern of visible light is emitted from the lens.

21. The vehicle headlight defined in claim 20 wherein the visible-light-blocking-and-infrared-light-passing filter is configured to:
in the first mode, allow infrared light rays from the emitted mixed infrared and visible light to pass by the visible-light-blocking-and-infrared-light-passing filter from the reflector to the lens; and
in the second mode, allow the infrared light rays from the emitted mixed infrared and visible light to pass through the visible-light-blocking-and-infrared-light-passing filter from the reflector to the lens.

22. The vehicle defined in claim 18 wherein the optical combiner comprises a transparent member with a first arm that receives the infrared light and a second arm that receives the visible light.

* * * * *